United States Patent
Cui

(10) Patent No.: US 12,047,980 B2
(45) Date of Patent: Jul. 23, 2024

(54) ELECTRONIC DEVICE, WIRELESS COMMUNICATION METHOD, AND COMPUTER READABLE MEDIUM FOR USING AND MANAGING A PLURALITY OF BANDWIDTH PARTS

(71) Applicant: Sony Group Corporation, Tokyo (JP)

(72) Inventor: Tao Cui, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 459 days.

(21) Appl. No.: 17/298,953

(22) PCT Filed: Jan. 6, 2020

(86) PCT No.: PCT/CN2020/070370
§ 371 (c)(1),
(2) Date: Jun. 2, 2021

(87) PCT Pub. No.: WO2020/143562
PCT Pub. Date: Jul. 16, 2020

(65) Prior Publication Data
US 2022/0061054 A1   Feb. 24, 2022

(30) Foreign Application Priority Data
Jan. 10, 2019 (CN) .......................... 201910024027.7

(51) Int. Cl.
*H04W 72/52* (2023.01)
*H04W 72/044* (2023.01)
(Continued)

(52) U.S. Cl.
CPC ......... *H04W 72/52* (2023.01); *H04W 72/044* (2013.01); *H04W 72/1273* (2013.01); *H04W 72/23* (2023.01)

(58) Field of Classification Search
CPC ............... H04W 72/52; H04W 72/044; H04W 72/1273; H04W 72/23; H04W 72/0453;
(Continued)

(56) References Cited

U.S. PATENT DOCUMENTS

2017/0041929 A1   2/2017 Noh
2018/0343154 A1*  11/2018 Park ...................... H04L 5/0007
(Continued)

FOREIGN PATENT DOCUMENTS

CN     106686726 A    5/2017
CN     107889114 A    4/2018
(Continued)

OTHER PUBLICATIONS

International Search Report and Written Opinion mailed on Apr. 2, 2020, received for PCT Application PCT/CN2020/070370, Filed on Jan. 6, 2020, 13 pages including English Translation.
(Continued)

*Primary Examiner* — Ian N Moore
*Assistant Examiner* — Sun Jong Kim
(74) *Attorney, Agent, or Firm* — XSENSUS LLP

(57) ABSTRACT

An electronic device for wireless communication, a wireless communication method, and a computer readable medium. The electronic device includes a processing circuit for receiving indication information from a base station on a set of bandwidth parts, the set of bandwidth parts including one or more bandwidth parts, and for communicating with the base station by using at least one bandwidth part in the set of bandwidth parts.

26 Claims, 7 Drawing Sheets

(51) Int. Cl.
*H04W 72/1273* (2023.01)
*H04W 72/23* (2023.01)

(58) Field of Classification Search
CPC ........... H04W 72/0457; H04W 72/231; H04W 72/232; H04L 5/00; H04L 5/0053
See application file for complete search history.

(56) References Cited

U.S. PATENT DOCUMENTS

2021/0007101 A1\* 1/2021 Tooher .............. H04W 72/0446
2022/0007418 A1\* 1/2022 Liu ................... H04W 74/0808

FOREIGN PATENT DOCUMENTS

| CN | 107926047 A | 4/2018 |
| CN | 108633105 A | 10/2018 |
| CN | 108934075 A | 12/2018 |
| CN | 109565717 A | 4/2019 |
| WO | 2018/084571 A1 | 5/2018 |
| WO | WO-2019001411 A1 | 1/2019 |

OTHER PUBLICATIONS

Huawei et al., "NR Numerology and Frame Structure for Unlicensed Bands", R1-1813903, 3GPP TSG RAN WG1 Meeting #95, Nov. 12-16, 2018, 14 pages.
InterDigital Inc., "BWP Operation in Unlicensed Spectrum", R1-1806968, 3GPP RAN WG1 Meeting #93, May 21-25, 2018, pp. 1-4.

\* cited by examiner

ELECTRONIC DEVICE, WIRELESS COMMUNICATION METHOD, AND COMPUTER READABLE MEDIUM FOR USING AND MANAGING A PLURALITY OF BANDWIDTH PARTS

CROSS-REFERENCE TO RELATED APPLICATIONS

This application is based on PCT filing PCT/CN2020/070370, filed Jan. 6, 2020, which claims the priority of Chinese Patent Application No. 201910024027.7, entitled "ELECTRONIC DEVICE, WIRELESS COMMUNICATION METHOD, AND COMPUTER READABLE MEDIUM", filed with the Chinese Patent Office on Jan. 10, 2019, the entire contents of each are incorporated herein by reference.

FIELD OF THE INVENTION

Technical Field

The present disclosure relates generally to the technical field of wireless communication, and more particularly to an electronic device for wireless communication, a wireless communication method, and a computer readable medium.

Background Art

A Band Width Part (BWP) refers to a set of continuous resource blocks on a carrier. A BWP-based operation, such as configuring a plurality of BWPs, activating a single or a plurality of BWPs, and transmitting for example a Physical Downlink Shared Channel (PDSCH) or Physical Uplink Shared Channel (PUSCH) on one or more BWPs based on Clear Channel Assessment (CCA), can be performed in a carrier greater than 20 MHz.

SUMMARY OF THE INVENTION

A brief summary of embodiments of the present disclosure is given below, to provide a basic understanding of some aspects of the present disclosure. It should be understood that the following summary is not an exhaustive summary of the present disclosure. It does not intend to determine a key or important part of the present disclosure, nor does it intend to limit the scope of the present disclosure. Its object is only to present some concepts in a simplified form, which serves as a preamble of a more detailed description to be discussed later.

According to an embodiment, there is provided an electronic device for wireless communication, comprising processing circuitry. The processing circuitry is configured to perform control to receive indication information on a bandwidth part set from a base station, the bandwidth part set comprising one or more bandwidth parts. The processing circuitry is further configured to perform control to communicate with the base station using at least one bandwidth part in the bandwidth part set.

According to an embodiment, a wireless communication method comprises a step of receiving indication information on a bandwidth part set from a base station, the bandwidth part set comprising one or more bandwidth parts. The method further comprises a step of communicating with the base station using at least one bandwidth part in the bandwidth part set.

According to an embodiment, there is provided an electronic device for wireless communication, comprising processing circuitry. The processing circuitry is configured to perform control to transmit indication information on a bandwidth part set to user equipment, the bandwidth part set comprising one or more bandwidth parts. The processing circuitry is further configured to perform control to communicate with the user equipment using at least one bandwidth part in the bandwidth part set.

According to an embodiment, a wireless communication method comprises a step of transmitting indication information on a bandwidth part set to user equipment, the bandwidth part set comprising one or more bandwidth parts. The method further comprises a step of communicating with the user equipment using at least one bandwidth part in the bandwidth part set.

According to an embodiment, there is provided an electronic device for wireless communication, comprising processing circuitry. The processing circuitry is configured to perform control to detect a preamble signal or channel on a target bandwidth part, the preamble signal or channel containing information on a future occupancy duration of the target bandwidth part. The processing circuitry is further configured to perform control to notify the information on the future occupancy duration to a base station.

According to an embodiment, a wireless communication method comprises a step of detecting a preamble signal or channel on a target bandwidth part, the preamble signal or channel containing information on a future occupancy duration of the target bandwidth part. The method further comprises a step of notifying the information on the future occupancy duration to a base station.

According to an embodiment, there is provided an electronic device for wireless communication, comprising processing circuitry. The processing circuitry is configured to perform control to receive information on a future occupancy duration of a target bandwidth part from user equipment, wherein the information on the future occupancy duration is obtained by the user equipment by performing detection on a preamble signal or channel on the target bandwidth part. The processing circuitry is further configured to, based on the future occupancy duration, perform control to send downlink transmission to the user equipment.

According to an embodiment, a wireless communication method comprises a step of receiving information on a future occupancy duration of a target bandwidth part from user equipment, wherein the information on the future occupancy duration is obtained by the user equipment by detecting a preamble signal or channel on the target bandwidth part. The method further comprises a step of sending downlink transmission to the user equipment based on the future occupation duration.

According to another embodiment, there is provided a computer readable medium comprising executable instructions that, when executed by an information processing apparatus, cause the information processing apparatus to execute the foregoing methods.

Through the embodiments of the present disclosure, it is possible to make it convenient to perform configuration of bandwidth parts and/or to perform transmission using the bandwidth parts, for example.

BRIEF DESCRIPTION OF THE DRAWINGS

The present disclosure can be better understood by making reference to the detailed description given below in combination with the appended drawings, wherein throughout the appended drawings, the same or similar reference signs are used to denote the same or similar components. The appended drawings together with the detailed description below are included in this specification and form a part of this specification, and are used to further illustrate the preferred embodiments of the present disclosure and explain the principles and advantages of the present disclosure. In the appended drawings.

DETAILED DESCRIPTION OF THE EMBODIMENTS

Embodiments of the present disclosure will be explained with reference to the appended drawings below. The elements and features described in one figure or one implementation of the present disclosure may be combined with the elements and features shown in one or more other figures or implementations. It should be noted that, for the purpose of clarity, representations and descriptions of components and processes that are not related to the present disclosure and known to those ordinarily skilled in the art are omitted from the figures and descriptions.

Figure 1:
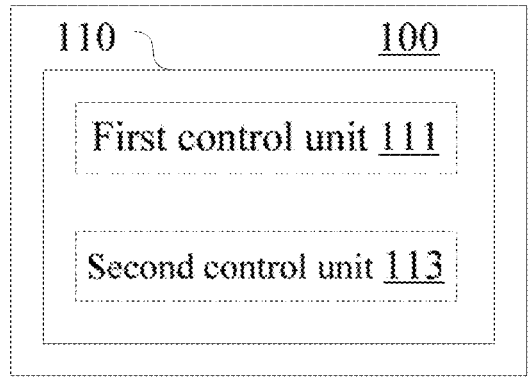
FIG. 1 is a block diagram showing a configuration example of an electronic device for wireless communication according to an embodiment of the present disclosure.

A configuration example of an electronic device for wireless communication according to an embodiment of the present disclosure will be explained below with reference to FIG. 1. As shown in FIG. 1, the electronic device 100 for wireless communication according to the present embodiment comprises processing circuitry 110. The processing circuitry 110 may be realized as a specific chip, chipset, central processing unit (CPU) or the like, for example.

The electronic device according to the present embodiment may be realized on user equipment (UE) side, for example.

The processing circuitry 110 includes a first control unit 111 and a second control unit 113. It should be noted that, although the first control unit 111 and the second control unit 113 are shown in the form of functional blocks in the figure, it should be understood that the functions of respective units may also be realized by the processing circuitry as a whole, but not necessarily by discrete actual components in the processing circuitry. In addition, although the processing circuitry is shown by one frame in the figure, the electronic device may include a plurality of processing circuitries, and the functions of the respective units may be distributed into the plurality of processing circuitries, so as to perform these functions in cooperation by the plurality of processing circuitries.

The first control unit 111 is configured to perform control to receive indication information on a bandwidth part set from a base station, the bandwidth part set comprising one or more bandwidth parts.

The second control unit 113 is configured to perform control to communicate with the base station using at least one bandwidth part in the bandwidth part set.

For example, the indication information can be included in radio resource control (RRC) signaling, and the indication information can indicate a set of configured bandwidth parts. In this case, the UE can select a bandwidth part for performing an uplink transmission through a plurality of configured bandwidth parts in a grant-free manner, for example.

Alternatively, the indication information can be included in downlink control information (DCI), and the indication information can indicate a set of activated bandwidth parts. In this case, the base station side determines one or more activated bandwidth parts from among a plurality of configured bandwidth parts, and notifies the set of the activated bandwidth parts to the UE.

The activated bandwidth parts are a subset of the configured bandwidth parts, and a number of sets of the activated bandwidth parts depends on a number of the configured bandwidth parts. Correspondingly, a bit width of the indication information can be determined based on a number of the configured bandwidth parts.

Before describing indication information for a BWP set according to an embodiment of the present disclosure, as a comparative example, a method for determining a bit width of indication information for indicating BWPs in DCI will be described first.

The bit width of the indication information for indicating the BWPs can be determined as $\lceil \log_2(n_{BWP}) \rceil$, where $\lceil \ \rceil$ represents rounding up. In the case of $n_{BWP,RRC} \leq 3$, $n_{BWP}=n_{BWP,RRC}+1$ can be set. In this case, a BWP indication is equivalent to a high-level parameter BWP-ID. Alternatively, $n_{BWP}=n_{BWP,RRC}$ can be set. Assuming that the number of the configured BWPs is 4, the BWP indication can be as defined in Table 1 below.

TABLE 1

| Values of BWP Indication Fields (2 bits) | BWPs |
| --- | --- |
| 00 | First BWP configured by High Level |
| 01 | Second BWP configured by High Level |
| 10 | Third BWP configured by High Level |
| 11 | Fourth BWP configured by High Level |

Different from the indication information for the BWPs as described above, the indication information according to the present embodiment indicates a set of BWPs, wherein each set can comprise one or more BWPs.

Also assuming that the number of the configured BWPs is 4, then the number of the BWP sets is 15. Correspondingly, the bit width of the indication information can be set to 4, and the BWP set indication can be as defined in Table 2 below, for example.

TABLE 2

| Values of Indication Fields (4 bits) | BWP Sets |
| --- | --- |
| 0000 | First BWP configured by High Level |
| 0001 | Second BWP configured by High Level |
| 0010 | Third BWP configured by High Level |
| 0011 | Fourth BWP configured by High Level |
| 0100 | First and second BWPs |
| 0101 | First and third BWPs |
| 0110 | First and fourth BWPs |
| 0111 | Second and third BWPs |
| 1000 | Second and fourth BWPs |
| 1001 | Third and fourth BWPs |
| 1010 | First and second and third BWPs |
| 1011 | First and second and fourth BWPs |
| 1100 | First and third and fourth BWPs |
| 1101 | Second and third and fourth BWPs |
| 1110 | First and second and third and fourth BWPs |
| 1111 | Retained |

It should be noted that, the setting of the indication information of the BWP set is not limited to the above examples, but can be performed in various ways. For example, the BWP set indication can also be defined in a way similar to bitmap, wherein each bit corresponds to one configured BWP. When a value of a certain bit is 1, it means that a corresponding BWP is activated, as shown in Table 3 below.

TABLE 3

| Values of Indication Fields (4 bits) | BWP Sets |
| --- | --- |
| 1000 | First BWP |
| 0100 | Second BWP |
| 0010 | Third BWP |
| 0001 | Fourth BWP |
| 1100 | First and second BWPs |
| 1010 | First and third BWPs |
| 1001 | Frist and fourth BWPs |
| 0110 | Second and third BWPs |
| 0101 | Second and fourth BWPs |
| 0011 | Third and fourth BWPs |
| 1110 | First and second and third BWPs |
| 1101 | First and second and fourth BWPs |
| 1011 | First and third and fourth BWPs |
| 0111 | Second and third and fourth BWPs |
| 1111 | First and second and third and fourth BWPs |
| 0000 | Retained |

The contents related to the configuration and activation of a plurality of BWPs in the embodiments have been explained above. Next, contents related to transmission using a plurality of BWPs will be explained.

According to an embodiment, the control unit 111 can be configured to perform control to detect a preamble signal or channel on a target bandwidth part, wherein the preamble signal or channel contains information on a future occupancy duration of the target bandwidth part.

The second control unit 113 can be configured to perform control to notify the information on the future occupancy duration to the base station. In addition to the information on the future occupancy duration, it is also possible to notify information on a degree of congestion of the target bandwidth part to the base station.

In addition, the second control unit 113 can be further configured to perform control to receive downlink transmission, which is sent by the base station based on the future occupancy duration of the target bandwidth part.

That is, the UE can perform the function of reporting channel availability by detecting a preamble signal or channel, and thereby can help the base station to select a BWP and a corresponding CCA timing and the like, for example. By doing so, for example, when it is determined that the same or different radio access technologies (RAT) occupy a specific channel for a long time, the base station can omit unnecessary channel detection, thereby improving processing efficiency.

This process may be regarded as enhanced preamble detection with a channel occupancy duration indication. By the way, it is possible to perform preamble detection only at a BWP where downlink transmission cannot be performed due to failure of LBT (Listening Before Transmission), and energy detection can be applied to all BWPs that attempt to access.

The specific form of channel occupancy information may be different according to a type of preamble. For example, an enhanced new radio (NR) channel or signal can be defined, which indicates a channel occupation duration and a degree of congestion of an RAT internal device occupying a channel, for example. In addition, the type of preamble can also include, for example, 802.11a/802.11ax preamble, which can also indicate the channel occupation duration and the degree of congestion of the RAT internal device occupying the channel.

Next, an example method of performing downlink transmission according to channel occupancy information will be explained in more detail.

In an embodiment, if an end time of occupation of the target bandwidth part is later than a scheduled start time of the downlink transmission by less than or equal to one time slot, the downlink transmission can be performed on the target bandwidth part through partial slot transmission. If an end time of occupation of the target bandwidth part is later than a scheduled start time of the downlink transmission by more than one time slot, the downlink transmission is not performed through the target bandwidth part, that is, the use for the target bandwidth part can be abandoned.

Figure 9A:
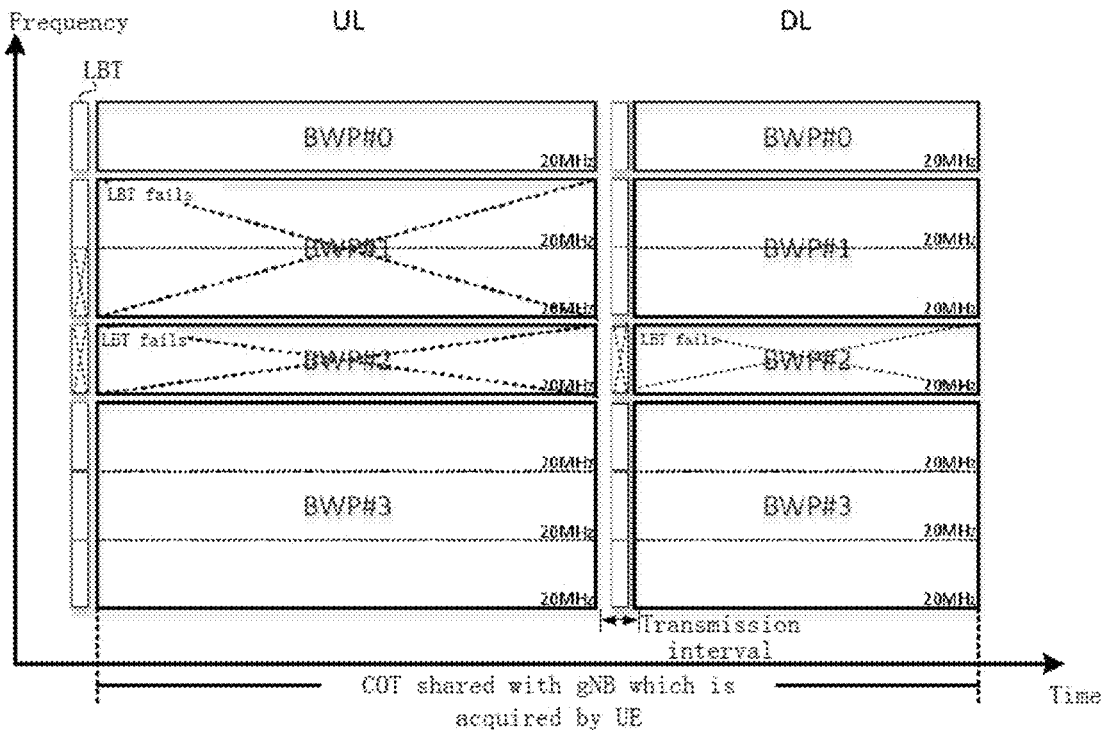
FIGS. 9A and 9B are schematic diagrams for explaining an example transmission process performed within a shared occupation time of user equipment and a base station.
Figure 9B:
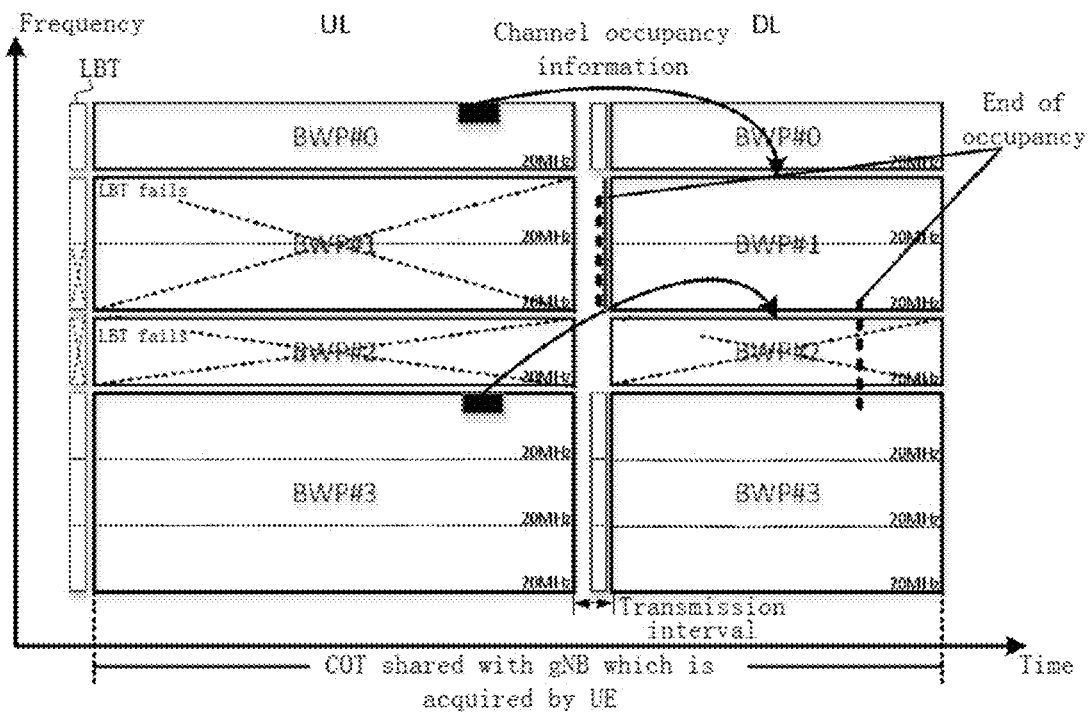

Referring to the examples of FIGS. 9A and 9B, wherein FIG. 9A shows an example of transmission in a case where a user does not provide channel occupancy information, and FIG. 9B shows an example of transmission in a case where the user provides channel occupancy information.

As shown in FIG. 9A, in the case where the user does not provide channel occupancy information, before uplink transmission, the UE performs LBT on each bandwidth, wherein LBT of BWP #2 and a part of BWP #1 fails, so no uplink transmission is performed on BWP #1 and BWP #2. Similarly, before downlink transmission, the base station performs LBT on each bandwidth part, wherein LBT of BWP #2 fails, so no downlink transmission is performed on BWP #2.

For the case where the user provides channel occupancy information, as shown in FIG. 9B, before uplink transmission, the UE performs LBT on each bandwidth part, wherein LBT of BWP #2 and a part of BWP #1 fails, so no uplink transmission is performed on BWP #1 and BWP #2. However, the UE transmits channel occupancy information, which indicates a channel occupancy time of BWP #1, to the base station through BWP #0, and the UE transmits channel occupancy information, which indicates a channel occupancy time of BWP #2, to the base station through BWP #3. According to the channel occupancy information, the base station can determine stop times of channel occupancy of BWP #1 and BWP #2.

Since an end time of occupancy of BWP #1 is earlier than a scheduled start time of the downlink transmission, the base station can perform the downlink transmission on BWP #1 without performing LBT.

In addition, although not shown in the figure, if an end time of occupancy of BWP #1 is later than the scheduled start time of the downlink transmission by less than or equal to one time slot, the downlink transmission can be performed on BWP #1 through partial slot transmission.

For BWP #2, since its end time of occupancy is later than a scheduled start time of the downlink transmission by more than one time slot, the base station does not perform the downlink transmission through BWP #2.

In addition, in the case of obtaining information on a future occupancy duration, the base station can determine, based on an interval between the end time of occupation of the target bandwidth part and the scheduled start time of the downlink transmission, whether to perform channel detection used for the downlink transmission for the target bandwidth part.

For example, if a detection result of the UE indicates that no other device is occupying the target bandwidth part, the base station can directly use the target bandwidth part to continue the downlink transmission without performing channel detection.

In addition, the base station can determine, based on the interval between the end time of occupation of the target bandwidth part and the scheduled start time of the downlink transmission, a type of the channel detection to be performed. As an example, there are the following LBT types: CAT1 LBT, that is, LBT is not executed; CAT2 LBT, that is, LBT is executed, and random fallback is not executed; CAT3 LBT, that is, LBT is executed, and a size of a fallback contention window is fixed; CAT4 LBT, that is, LBT is executed, and a size of a fallback contention window is variable.

The following interval can be defined: an interval between an end time of occupancy of the target bandwidth part determined according to the preamble signal detected by the UE and a start time of designated downlink transmission. For example, if the interval is less than 16 μm, the downlink transmission can be performed immediately without LBT; if the interval is between 16 μm and 25 μm, a one shot LBT can be performed; if the interval>25 μm, CAT4 LBT can be performed. It should be noted that the above examples are only illustrative and not limitative.

The downlink transmission described above can be performed within a shared occupation time (shared COT) for the bandwidth part set of the user equipment and the base station.

The shared occupation time can be obtained by the user equipment and shared to the base station. For example, in the examples as shown in FIGS. 9A and 9B, the channel occupation time is acquired by the UE, and is shared to the base station for downlink transmission.

In addition, the shared occupation time can also be obtained by the base station and shared to the user equipment.

Figure 10A:
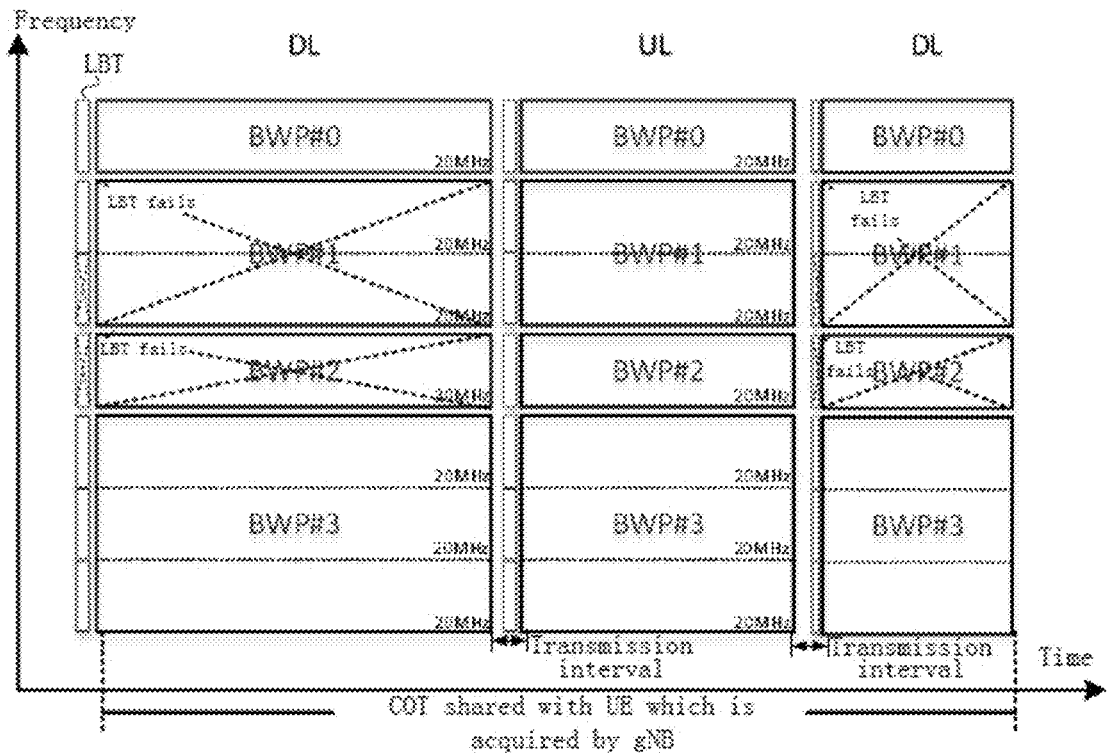
FIGS. 10A and 10B are schematic diagrams for explaining another example transmission process performed within a shared occupation time of user equipment and a base station.
Figure 10B:
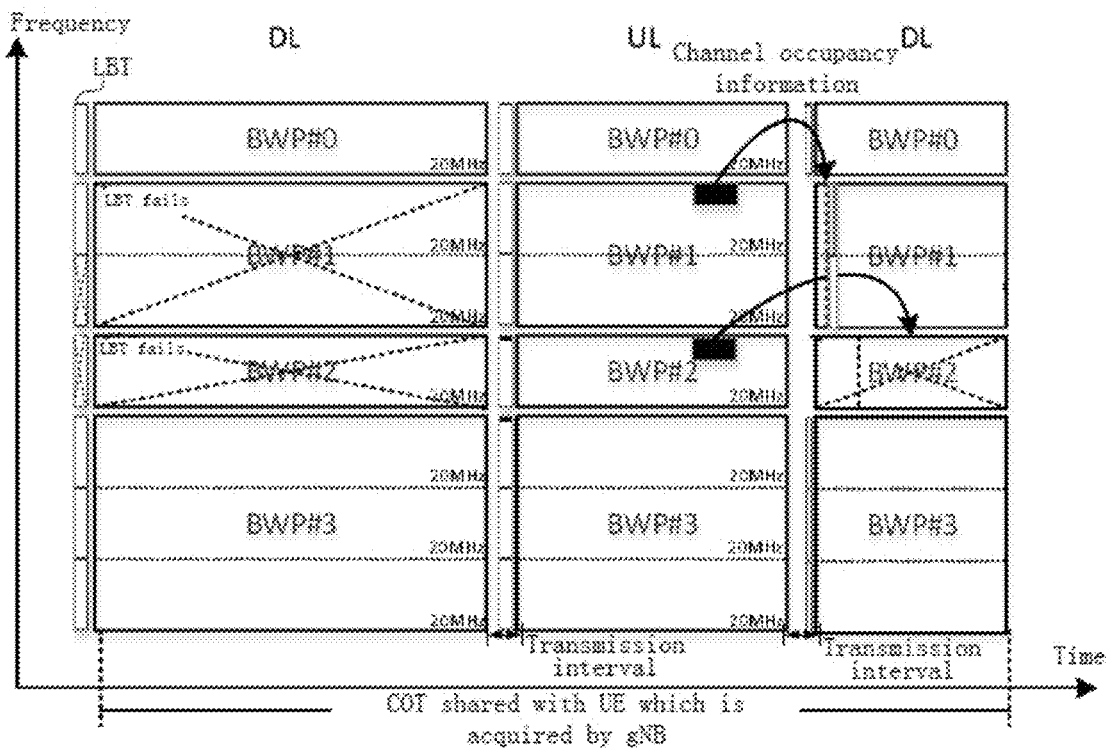

Referring to FIGS. 10A and 10B, wherein FIG. 10A shows an example of transmission in a case where a user does not provide channel occupancy information, and FIG. 10B shows an example of transmission in a case where the user provides channel occupancy information.

As shown in FIG. 10A, the channel occupancy time is acquired by the base station for downlink transmission, and is shared to the UE for uplink transmission. In the case where the user does not provide channel occupancy information, before downlink transmission, the base station performs LBT on each bandwidth part, wherein LBT of BWP #2 and a part of BWP #1 fails, so no downlink is performed on BWP #1 and BWP #2. Next, before uplink transmission, the UE performs LBT on each bandwidth part, and performs uplink transmission. Then, before performing downlink transmission again within the channel occupation time, the base station performs LBT on each bandwidth part, wherein LBT of BWP #2 and a part of BWP #1 fails, so no downlink transmission is performed on BWP #1 and BWP #2.

For the case where the user provides channel occupancy information, as shown in FIG. 10B, before downlink transmission, the base station performs LBT on each bandwidth part, wherein LBT of BWP #2 and a part of BWP #1 fails, so no downlink transmission is performed on BWP #1 and BWP #2. Next, before uplink transmission, the UE performs LBT on each bandwidth part and performs uplink transmission. In this process, the UE transmits channel occupancy information, which indicates a channel occupancy time of BWP #1, to the base station through BWP #1, and the UE transmits channel occupancy information, which indicates a channel occupancy time of BWP #2, to the base station through BWP #2. According to the channel occupancy information, the base station can determine stop times of channel occupancy of BWP #1 and BWP #2.

When the downlink transmission is performed again within the channel occupation time, since an end time of occupancy of BWP #1 is later than a scheduled start time of the downlink transmission by less than or equal to one time slot, the downlink transmission can be performed on BWP #1 through partial slot transmission.

For BWP #2, since its end time of occupancy is later than a scheduled start time of the downlink transmission by more than one time slot, the base station does not perform the downlink transmission through BWP #2.

It should be noted that the above examples are only illustrative and not limitative.

In addition, according to an embodiment, the second control unit 113 can be configured to perform control to transmit the information on the future occupancy duration through another bandwidth part other than the target bandwidth part.

The another bandwidth part comprises a bandwidth part having a preset correspondence with the target bandwidth part, so that the base station can determine the target bandwidth based on the preset correspondence.

For example, the preset correspondence can include an adjacent relationship. Referring again to FIG. 9B, the UE transmits channel occupation information, which indicates a channel occupation time of BWP #1 adjacent to BWP #0, to the base station through BWP #0, and the UE transmits channel occupation information, which indicates a channel occupation time of BWP #2 adjacent to BWP #3, to the base station through BWP #3. In addition, the indication information transmitted by the UE can include, for example, an indication bit to indicate an abutting direction of the BWPs. Alternatively, a correspondence of rotation can be set, wherein for example, occupancy information of BWP #1 is indicated by BWP #0, occupancy information of BWP #2 is indicated by BWP #1, occupancy information of BWP #3 is indicated by BWP #2, and occupation information of BWP #0 is indicated by BWP #3.

It should be noted that, the preset correspondence is not limited to the above examples, but can include any preset correspondence, as long as it enables the base station to determine the target BWP according to the BWP that transmits the indication information.

In addition, according to an embodiment, the second control unit 113 can be further configured to: in a case of performing uplink transmission using a target bandwidth part, perform control to transmit a preamble signal or channel containing information on a future occupancy duration of the target bandwidth part. Accordingly, other devices can determine an occupation situation of the current device for the target bandwidth part.

In addition, according to an embodiment, it is possible to determine a future occupancy duration of the target bandwidth part by the base station, and transmit indication information of the future occupancy duration of the target bandwidth part to the user equipment, for example, transmit indication information of the future occupancy duration of the target bandwidth part to the user equipment through DCI and/or RRC signaling, so that the user equipment can perform corresponding data transmission. Specifically, for example, the base station configures a plurality of bandwidth parts for the user equipment by transmitting high-level signaling such as RRC signaling to the user equipment, includes the indication information of the activated bandwidth parts in downlink control information and notifies it to the user equipment, and determines a future occupancy duration of the activated target bandwidth parts, and includes the indication information of the future occupation duration in downlink control information and transmits it to the user equipment, wherein the future occupation duration corresponds to a predetermined number of time slots.

In the foregoing description of the device according to the embodiment of the present disclosure, it is obvious that some methods and processes have also been disclosed. Next, without repeating the previously described details, a description of a wireless communication method according to an embodiment of the present disclosure will be given.

Figure 2:
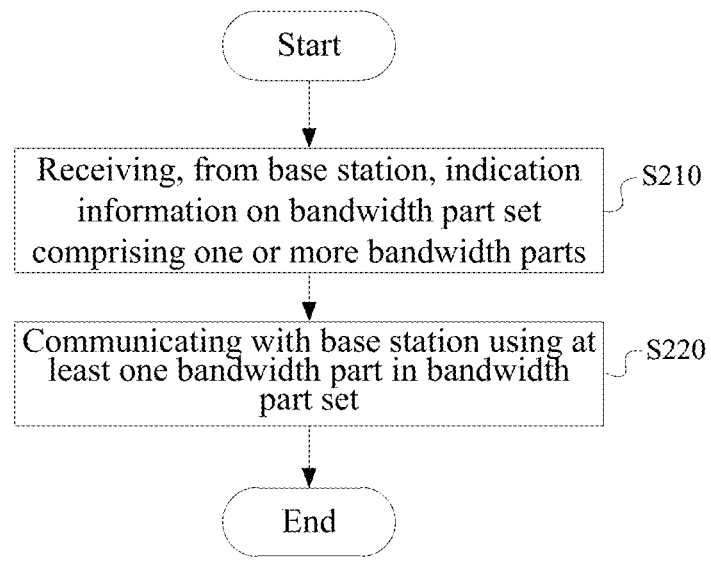
FIG. 2 is a flowchart showing a process example of a wireless communication method according to an embodiment of the present disclosure.

As shown in FIG. 2, the wireless communication method according to the present embodiment comprises a step S210 of receiving indication information on a bandwidth part set from a base station, wherein the bandwidth part set comprises one or more bandwidth parts.

In addition, the method further comprises a step S220 of communicating with the base station using at least one bandwidth part in the bandwidth part set.

The embodiment that can be implemented on user equipment side has been described above. In addition, the embodiments of the present disclosure further include a device and a method that can be implemented on base station side. Next, without repeating details corresponding to the previously described details, a description of an embodiment of the apparatus and method corresponding to base station side according to the embodiment of the present disclosure will be given.

Also referring to FIG. 1, the electronic device 100 for wireless communication according to the present embodiment comprises processing circuitry 110. The processing circuitry 110 includes a first control unit 111 and a second control unit 113.

The first control unit 111 is configured to perform control to transmit indication information on a bandwidth part set to user equipment, the bandwidth part set comprising one or more bandwidth parts.

The second control unit 113 is configured to perform control to communicate with the user equipment using at least one bandwidth part in the bandwidth part set.

According to an embodiment, the second control unit 113 can be further configured to perform control to receive information on a future occupancy duration of the target bandwidth part from the user equipment. The information on the future occupancy duration can be obtained by the user equipment by performing detection on a preamble signal or channel on the target bandwidth part.

According to an embodiment, the second control unit 113 can be further configured to perform control, based on the future occupancy duration of the target bandwidth part, to send downlink transmission to the user equipment.

The downlink transmission can be performed within a shared occupation time for the bandwidth part set of the user equipment and a base station. The shared occupation time can be obtained by the user equipment or can be obtained by the base station.

If an end time of occupation of the target bandwidth part is later than a scheduled start time of the downlink transmission by less than or equal to one time slot, the downlink transmission can be performed on the target bandwidth part through partial slot transmission. If an end time of occupation of the target bandwidth part is later than a scheduled start time of the downlink transmission by more than one time slot, the downlink transmission is not performed through the target bandwidth part.

According to an embodiment, the second control unit 113 can be further configured to determine whether to perform channel detection used for the downlink transmission for the target bandwidth part, and/or determine a type of the channel detection, based on an interval between the end time of occupation of the target bandwidth part and the scheduled start time of the downlink transmission.

According to an embodiment, the second control unit 113 can be further configured to perform control to receive the information on the future occupancy duration through another bandwidth part other than the target bandwidth part. The another bandwidth part can comprise a bandwidth part having a preset correspondence with the target bandwidth part, thereby making it possible to determine the target bandwidth based on the preset correspondence.

Figure 3:
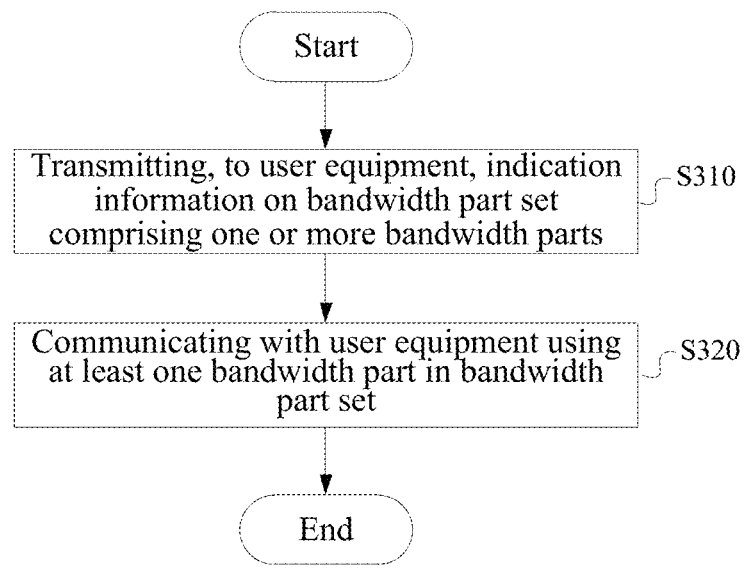
FIG. 3 is a flowchart showing a process example of a wireless communication method according to another embodiment of the present disclosure.

FIG. 3 shows a process example of a corresponding wireless communication method. As shown in FIG. 3, in S310, indication information on a bandwidth part set is transmitted to user equipment, wherein the bandwidth part set comprises one or more bandwidth parts. In S320, at least one bandwidth part in the bandwidth part set is used to communicate with the user equipment.

The embodiment of the aspect related to the configuration and activation of a plurality of BWPs has been described above. Although the aspect of performing transmission using of a plurality of BWPs is involved therein, the embodiments of these two aspects can be implemented independently of each other.

Next, an embodiment of a device and method of another aspect of the present disclosure will be explained, which includes the device and method corresponding to user equipment side and the device and method corresponding to base station side. Since part of the content of this aspect has been described above in conjunction with the embodiment of the first aspect, repetitive description of some details will be omitted below.

Also referring to FIG. 1, the electronic device 100 for wireless communication according to the present embodiment includes processing circuitry 110. The processing circuitry 110 includes a first control unit 111 and a second control unit 113.

The first control unit 111 is configured to perform control to detect a preamble signal or channel on a target bandwidth part, the preamble signal or channel containing information on a future occupancy duration of the target bandwidth part.

The second control unit 113 is configured to perform control to notify the information on the future occupancy duration to a base station. In addition, it is also possible to notify information on a degree of congestion of the target bandwidth part to the base station.

According to an embodiment, the second control unit 113 can be further configured to perform control to receive downlink transmission, which is sent by the base station based on the future occupancy duration of the target bandwidth part.

The downlink transmission can be performed within a shared occupation time for the bandwidth part set of user equipment and the base station. The shared occupation time can be obtained by the user equipment or is obtained by the base station.

If an end time of occupation of the target bandwidth part is later than a scheduled start time of the downlink transmission by less than or equal to one time slot, the downlink transmission can be performed on the target bandwidth part through partial slot transmission. If an end time of occupation of the target bandwidth part is later than a scheduled start time of the downlink transmission by more than one time slot, the downlink transmission is not performed through the target bandwidth part.

In addition, the base station can also determine, based on an interval between the end time of occupation of the target bandwidth part and the scheduled start time of the downlink transmission, whether to perform channel detection used for the downlink transmission for the target bandwidth part, and/or can determine a type of the channel detection.

According to an embodiment, the second control unit 113 can be further configured to perform control to transmit the information on the future occupancy duration through another bandwidth part other than the target bandwidth part.

The another bandwidth part can comprise a bandwidth part having a preset correspondence with the target bandwidth part, so that the base station can determine the target bandwidth based on the preset correspondence.

According to an embodiment, the second control unit 113 can be further configured to perform control to transmit a preamble signal or channel containing information on a future occupancy duration of the target bandwidth part.

According to an embodiment, the second control unit 113 can be further configured to perform control to receive indication information on a bandwidth part set from a base station, wherein the bandwidth part set comprises one or more bandwidth parts.

The indication information can be included in radio resource control signaling, and indicates a set of configured bandwidth parts. Alternatively, the indication information can be included in downlink control indication, and indicates a set of activated bandwidth parts.

A bit width of the indication information can be based on a number of configured bandwidth parts.

Figure 4:
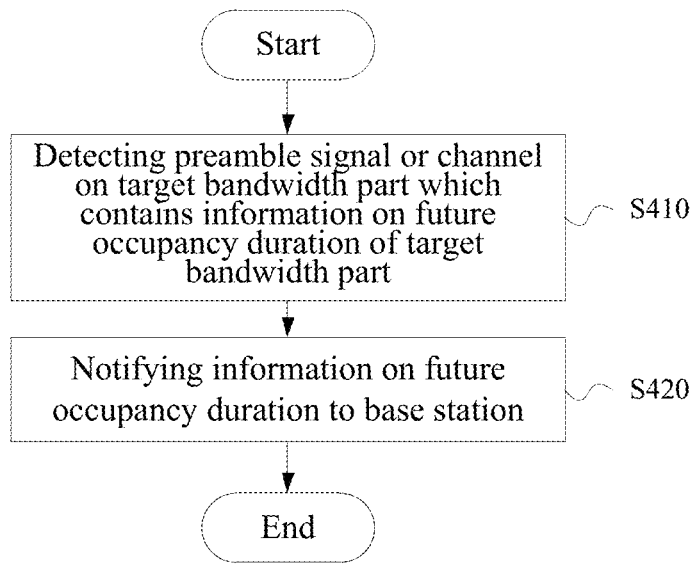
FIG. 4 is a flowchart showing a process example of a wireless communication method according to still another embodiment of the present disclosure.

FIG. 4 shows a process example of a corresponding wireless communication method. As shown in FIG. 4, the method comprises a step S410 of detecting a preamble signal or channel on a target bandwidth part. The preamble signal or channel contains information on a future occupancy duration of the target bandwidth part. The method further comprises a step S420 of notifying the information on the future occupancy duration to a base station.

Referring again to FIG. 1, an embodiment implemented on base station side in this aspect will be described.

The electronic device 100 for wireless communication according to the present embodiment comprises processing circuitry 110. The processing circuitry 110 includes a first control unit 111 and a second control unit 113.

The first control unit 111 is configured to perform control to receive information on a future occupancy duration of a target bandwidth part from user equipment. The information on the future occupancy duration can be obtained by the user equipment by performing detection on a preamble signal or channel on the target bandwidth part.

The second control unit 113 is configured to perform control, based on the future occupancy duration, to send downlink transmission to the user equipment.

The downlink transmission can be performed within a shared occupation time for the bandwidth part set of the user equipment and a base station. The shared occupation time can be obtained by the user equipment or is obtained by the base station.

If an end time of occupation of the target bandwidth part is later than a scheduled start time of the downlink transmission by less than or equal to one time slot, the downlink transmission can be performed on the target bandwidth part through partial slot transmission. If an end time of occupation of the target bandwidth part is later than a scheduled start time of the downlink transmission by more than one time slot, the downlink transmission is not performed through the target bandwidth part.

According to an embodiment, the second control unit 113 can be further configured to determine, based on an interval between the end time of occupation of the target bandwidth part and the scheduled start time of the downlink transmission, whether to perform channel detection used for the downlink transmission for the target bandwidth part, and/or can determine a type of the channel detection.

According to an embodiment, the first control unit 111 can be further configured to receive the information on the future occupancy duration through another bandwidth part other than the target bandwidth part.

The another bandwidth part can comprise a bandwidth part having a preset correspondence with the target bandwidth part, and the target bandwidth part can be determined based on the preset correspondence.

According to an embodiment, the second control unit 113 can be further configured to perform control to transmit indication information on a bandwidth part set to user equipment, the bandwidth part set comprising one or more bandwidth parts.

Figure 5:
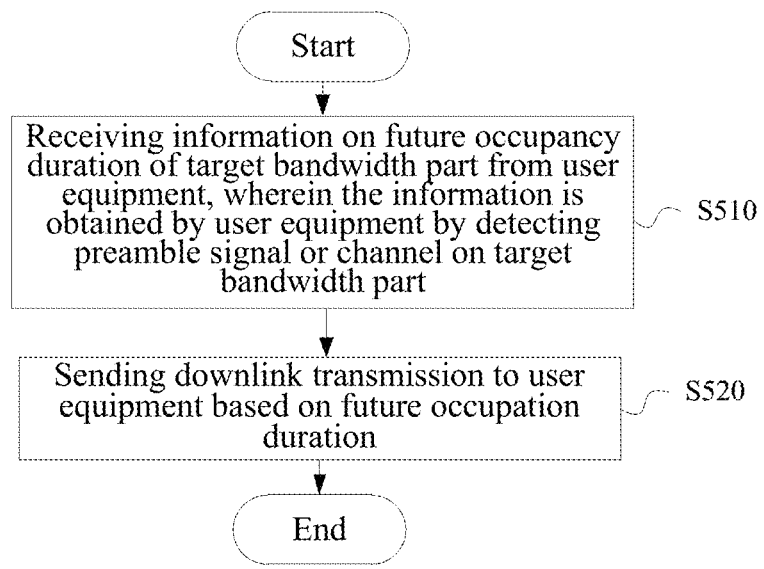
FIG. 5 is a flowchart showing a process example of a wireless communication method according to yet another embodiment of the present disclosure.

FIG. 5 shows a process example of a corresponding wireless communication method. As shown in FIG. 5, the method comprises a step S510 of receiving information on a future occupancy duration of the target bandwidth part from the user equipment. The information on the future occupancy duration can be obtained by the user equipment by performing detection on a preamble signal or channel on the target bandwidth part.

The method further comprises a step S520 of sending downlink transmission to the user equipment based on the future occupancy duration of the target bandwidth part.

Next, an embodiment of a device and method of still another aspect of the present disclosure will be explained, which includes the device and method corresponding to base station side and the device and method corresponding to user equipment side. Since part of the content of this aspect has been described above in conjunction with the embodiment of the first aspect, repetitive description of some details will be omitted below.

An embodiment implemented on base station side in this aspect will be described first.

An electronic device for wireless communication according to the present embodiment comprises processing circuitry, which includes a control unit configured to: configure a plurality of bandwidth parts for user equipment through radio resource control signaling; activate one or more configured bandwidth parts for the user equipment through downlink control information; determine a future occupation duration of a target bandwidth part; and transmit indication information of the future occupancy duration of the target bandwidth part to the user equipment.

As an example, the control unit can be further configured to: generate downlink control information and/or radio resource control signaling containing the indication information of the future occupation duration; transmit the indication information of the future occupation duration to user equipment.

As an example, the control unit can activate a plurality of configured bandwidth parts for the user equipment through downlink control information.

As an example, the electronic device is a base station.

A method for wireless communication according to the present embodiment comprises: configuring a plurality of bandwidth parts for user equipment through radio resource control signaling; activating one or more configured bandwidth parts for the user equipment through downlink control information; determining a future occupation duration of a target bandwidth part; and transmitting indication information of the future occupancy duration of the target bandwidth part to the user equipment.

An embodiment implemented on user equipment side in this aspect will be described below.

An electronic device for wireless communication according to the present embodiment comprises processing circuitry, which includes a processing unit configured to: perform corresponding bandwidth part configuration according to radio resource control signaling containing configuration information of a plurality of bandwidth parts; activate one or more configured bandwidth parts according to downlink control information; receive indication information containing a future occupation duration of a target bandwidth part from a base station; and perform data transmission with the base station according to the indication information of the future occupancy duration of the target bandwidth part.

As an example, the processing unit can be configured to activate a plurality of configured bandwidth parts according to downlink control information.

As an example, the electronic device is user equipment.

A method for wireless communication according to the present embodiment comprises: performing corresponding bandwidth part configuration according to radio resource control signaling containing configuration information of a plurality of bandwidth parts; activating one or more configured bandwidth parts according to downlink control information; receiving indication information containing a future occupation duration of a target bandwidth part from a base station; and performing data transmission with the base station according to the indication information of the future occupancy duration of the target bandwidth part.

In addition, an embodiment of the present disclosure further includes a computer readable medium comprising executable instructions that, when executed by an information processing apparatus, cause the information processing apparatus to execute the foregoing methods.

As an example, each step of the foregoing methods and each component module and/or unit of the foregoing devices may be implemented as software, firmware, hardware, or a combination thereof. In the case of implementation by software or firmware, a computer with a dedicated hardware structure (such as the general-purpose computer 1400 shown in FIG. 7) can be installed from a storage medium or network to a program that constitutes software for implementing the foregoing method. The computer, when installed with various programs, can perform various functions, etc.

Figure 6:
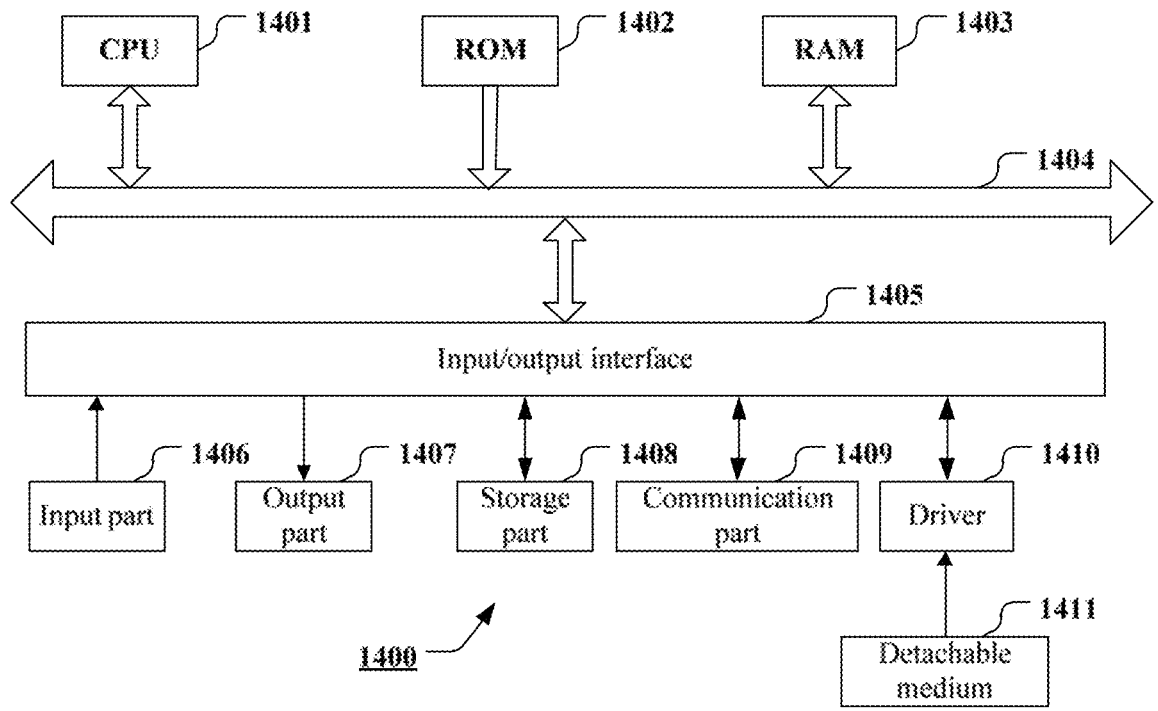
FIG. 6 is a block diagram showing an exemplary structure of a computer implementing the methods and devices of the present disclosure.

In FIG. 6, a central processing unit (i.e., CPU) 1401 performs various processing according to a program stored in a read-only memory (ROM) 1402 or a program loaded from a storage part 1408 to a random access memory (RAM) 1403. In the RAM 1403, data needed when the CPU 1401 performs various processing and the like is also stored as needed. The CPU 1401, the ROM 1402 and the RAM 1403 are connected to each other via a bus 1404. An input/output interface 1405 is also connected to the bus 1404.

The following components are connected to the input/output interface 1405: an input part 1406 (including a keyboard, a mouse and the like), an output part 1407 (including a display, such as a Cathode Ray Tube (CRT), a Liquid Crystal Display (LCD) and the like, as well as a speaker and the like), the storage part 1408 (including a hard disc and the like), and a communication part 1409 (including a network interface card such as an LAN card, a modem and the like). The communication part 1409 performs communication processing via a network such as the Internet. As needed, a drive 1410 is also connected to the input/output interface 1405. A detachable medium 1411 such as a magnetic disc, an optical disc, a magnetic optical disc, a semiconductor memory and the like is installed on the drive 1410 as needed, such that a computer program read therefrom is installed in the storage part 1408 as needed.

In the case of implementing the foregoing series of processing by software, programs constituting the software are installed from a network such as the Internet or a storage medium such as the detachable medium 1411.

Those skilled in the art should understand that such a storage medium is not limited to the detachable medium 1411 in which a program is stored and which is distributed separately from the apparatus to provide the program to a user as shown in FIG. 6. Examples of the detachable medium 1411 include a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the storage medium may be hard discs and the like included in the ROM 1402 and the storage part 1408, in which programs are stored and which are distributed concurrently with apparatus including them to users.

Embodiments of the present disclosure further relate to a program product having stored therein machine readable instruction codes that, when read and executed by a machine, can execute the foregoing methods according to the embodiments of the present disclosure.

Accordingly, a storage medium for carrying the above program product having stored therein machine readable instruction codes is also included in the present disclosure. The storage medium includes, but is not limited to, a floppy disc, an optical disc, a magnetic optical disc, a memory card, a memory stick and the like.

Embodiments of the present disclosure further relate to an electronic apparatus. The electronic apparatus, when used for base station side, may be realized as any type of gNB, Evolved node B (eNB), such as macro eNB and small eNB. The small eNB may be an eNB of a cell with smaller coverage than a macro cell, such as a pico eNB, a micro eNB and a home (femto) eNB. Alternatively, the electronic apparatus may be realized as any other type of base station, such as NodeB and Base Transceiver Station (BTS). The electronic apparatus may comprise: a main body (also referred to as base station equipment) configured to control wireless communication; and one or more Remote Radio Heads (RRHs) arranged at different places of the main body. In addition, all the various types of terminals which will be described below can operate as base stations by temporarily or semi-persistently executing base station functions.

The electronic apparatus, when used for user equipment side, may be realized as a mobile terminal (such as an intelligent telephone, a tablet Personal Computer (PC), a notebook PC, a portable game terminal, a portable/softdog mobile router and a digital image pick-up device) or an in-vehicle terminal (such as automobile navigation equipment). In addition, the electronic apparatus may be a wireless communication module (such as an integrated circuit module including a single or more wafers) installed on each of the above terminals.

Application Example with Regard to Terminal Equipment

Figure 7:
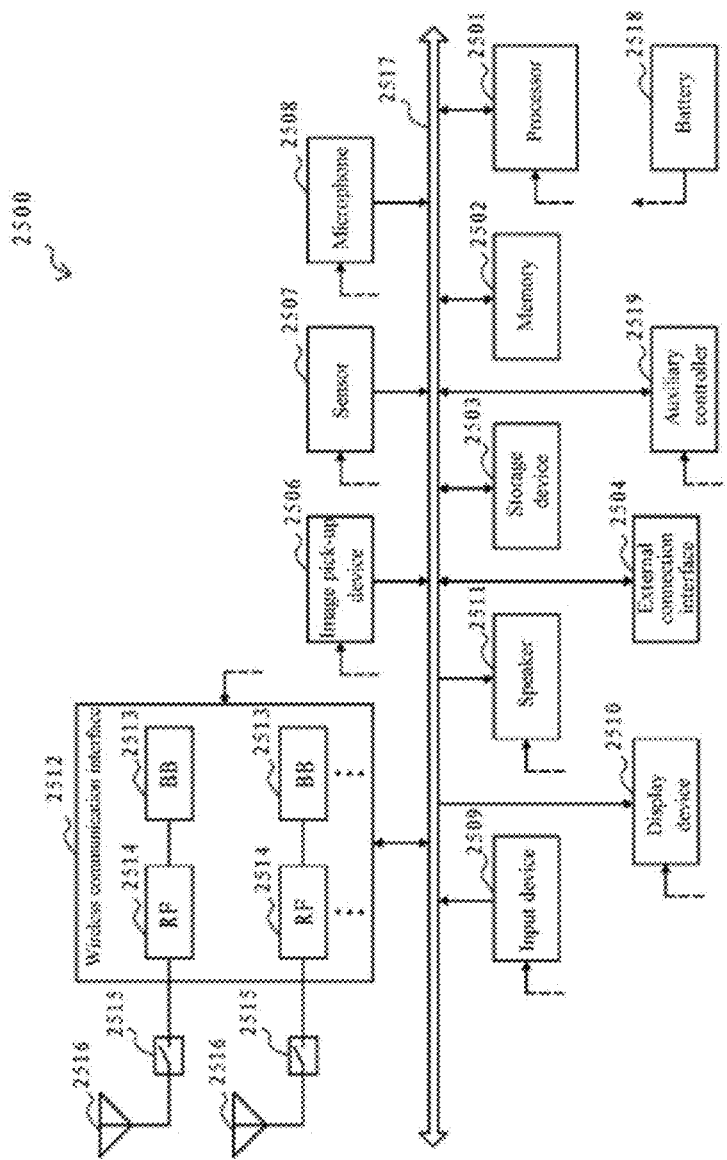
FIG. 7 is a block diagram showing an example of a schematic configuration of a smart phone to which the technology of the present disclosure may be applied.

FIG. 7 is a block diagram showing an example of a schematic configuration of an intelligent telephone 2500 to which the technology of the present disclosure may be applied. The intelligent telephone 2500 comprises a processor 2501, a memory 2502, a storage device 2503, an external connection interface 2504, an image pick-up device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the intelligent telephone 2500. The memory 2502 comprises an RAM and an ROM, and stores data and programs executed by the processor 2501. The storage device 2503 may comprise a storage medium, such as a semiconductor memory and a hard disc. The external connection interface 2504 is used for connecting an external device (such as a memory card and a Universal Serial Bus (USB) device) to an interface of the intelligent telephone 2500.

The image pick-up device 2506 comprises an image sensor (such as a Charge Coupled Device (CCD) and a Complementary Metal Oxide Semiconductor (CMOS)), and generates a captured image. The sensor 2507 may comprise a group of sensors, such as a measurement sensor, a gyro sensor, a geomagnetic sensor and an acceleration sensor. The microphone 2508 converts sound inputted to the intelligent telephone 2500 to an audio signal. The input device 2509 comprises for example a touch sensor configured to detect a touch on a screen of the display device 2510, a keypad, a keyboard, buttons or switches, and receives an operation or information inputted from a user. The display device 2510 comprises a screen (such as a Liquid Crystal Display (LCD) and an Organic Light-Emitting Diode (OLED) display), and displays an output image of the intelligent telephone 2500. The speaker 2511 converts the audio signal outputted from the intelligent telephone 2500 to sound.

The wireless communication interface 2512 supports any cellular communication scheme (such as LTE and LTE-Advanced), and executes wireless communication. The wireless communication interface 2512 generally may comprise for example a BB processor 2513 and a radio frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may comprise for example a frequency mixer, a filter and an amplifier, and transmit and receive a wireless signal via the antenna 2516. The wireless communication interface 2512 may be a chip module on which a BB processor 2513 and an RF circuit 2514 are integrated. As shown in FIG. 7, the wireless communication interface 2512 may comprise a plurality of BB processors 2513 and a plurality of RF circuits 2514. Although FIG. 7 shows an example in which the wireless communication interface 2512 comprises a plurality of BB processors 2513 and a plurality of RF circuits 2514, the wireless communication interface 2512 may also comprise a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may comprise a BB processor 2513 and an RF circuit 2514 for each wireless communication scheme.

Each of the antenna switches 2515 switches a connection destination of the antenna 2516 between a plurality of circuits included in the wireless communication interface 2512 (for example, circuits for different wireless communication schemes).

Each of the antennas 2516 comprises a single or more antenna elements (such as a plurality of antenna elements included in an MIMO antenna), and is used for the communication interface 2512 to transmit and receive a wireless signal. As shown in FIG. 7, the intelligent telephone 2500 may comprise a plurality of antennas 2516. Although FIG. 7 shows an example in which the intelligent telephone 2500 comprises a plurality of antennas 2516, the intelligent telephone 2500 may also comprise a single antenna 2516.

In addition, the intelligent telephone 2500 may comprise an antenna 2516 for each wireless communication scheme. In this case, the antenna switch 2515 may be omitted from the configuration of the intelligent telephone 2500.

The bus 2517 connects the processor 2501, the memory 2502, the storage device 2503, the external connection interface 2504, the image pick-up device 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the intelligent telephone 2500 as shown in FIG. 7 via feeder lines which are partially shown as dashed lines in the figure. The auxiliary controller 2519 manipulates the least necessary function of the intelligent telephone 2500 in a sleep mode, for example.

In the intelligent telephone 2500 as shown in FIG. 7, the transceiver device of the wireless communication apparatus at user equipment side according to the embodiment of the present disclosure may be realized by the wireless communication interface 2512. At least part of the functions of the processing circuitry and/or respective units of the electronic device or wireless communication apparatus at user equipment side according to the embodiment of the present disclosure may also be implemented by the processor 2501 or the auxiliary controller 2519. For example, part of the function of the processor 2501 may be implemented by the auxiliary controller 2519 so as to reduce power consumption of the battery 2518. In addition, the processor 2501 or the auxiliary controller 2519 may implement part of the functions of the processing circuitry and/or respective units of the electronic device or wireless communication apparatus at user equipment side according to the embodiment of the present disclosure by executing the program stored in the memory 2501 or the storage device 2503.

Application Example with Regard to Base Station

Figure 8:
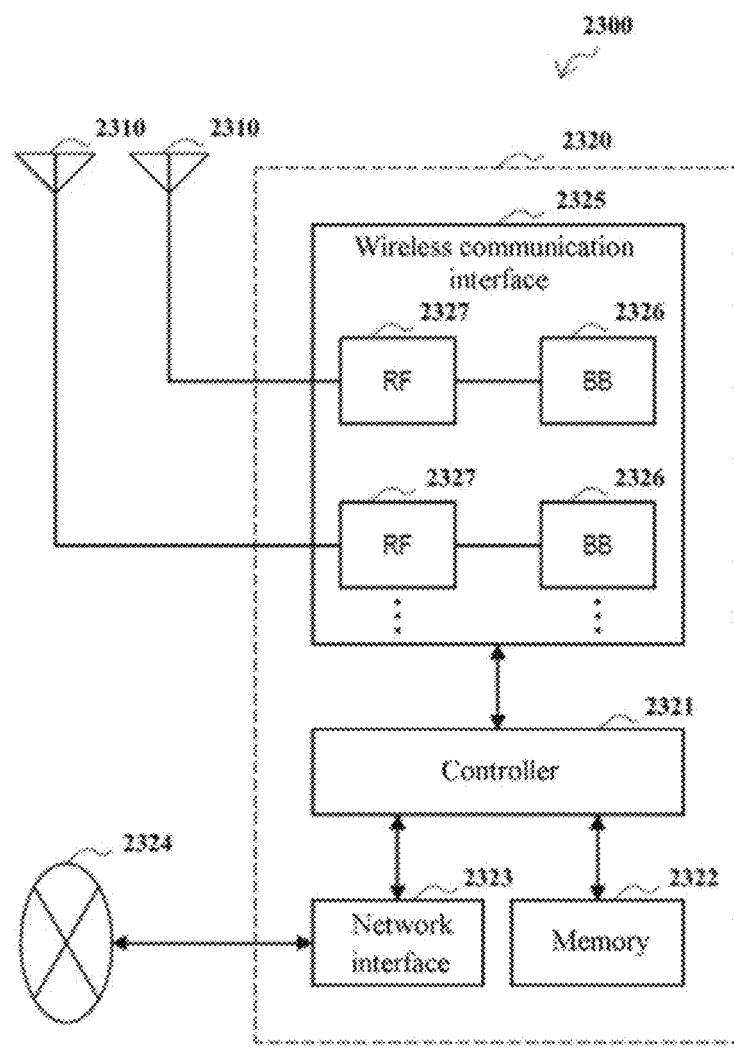
FIG. 8 is a block diagram showing an example of a schematic configuration of a gNB to which the technology of the present disclosure may be applied.

FIG. 8 is a block diagram showing an example of a schematic configuration of an gNB to which the technology of the present disclosure may be applied. The gNB 2300 comprises one or more antennas 2310 and a base station equipment 2320. The base station equipment 2320 and each antenna 2310 may be connected with each other via a radio frequency (RF) cable.

Each of the antennas 2310 comprises a single or more antenna elements (such as a plurality of antenna elements included in a Multi-Input Multi-Output (MIMO) antenna), and is used for the base station equipment 2320 to transmit and receive a wireless signal. As shown in FIG. 8, the gNB 2300 may comprise a plurality of antennas 2310. For example, the plurality of antennas 2310 may be compatible with a plurality of frequency bands used by the gNB 2300. Although FIG. 8 shows an example in which the gNB 2300 comprises a plurality of antennas 2310, the gNB 2300 may also comprise a single antenna 2310.

The base station equipment 2320 may comprise a controller 2321, a memory 2322, a network interface 2323, and a wireless communication interface 2325.

The controller 2321 may be for example a CPU or a DSP, and manipulate various functions of a higher layer of the base station equipment 2320. For example, the controller 2321 generates data packets according to data in a signal processed by the wireless communication interface 2325, and transfers the generated packets via the network interface 2323. The controller 2321 may perform binding for data from a plurality of baseband processors to generate bound packets, and transfer the generated bound packets. The controller 2321 may have a logic function of executing control, which is such as radio resource control, radio bearer control, mobility management, admission rule and dispatching. The control may be executed in combination with a nearby gNB or a core network node. The memory 2322 comprises an RAM and an ROM, and stores programs executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another gNB via the network interface 2323. In this case, the gNB 2300 and the core network node or another gNB may be connected to each other via a logic interface (such as S1 interface and X2 interface). The network interface 2323 may also be a wired communication interface, or a wireless communication interface for a wireless backhaul. If the network interface 2323 is a wireless communication interface, as compared with frequency bands used by the wireless communication interface 2325, the network interface 2323 may use higher frequency bands for wireless communication.

The wireless communication interface 2325 supports any cellular communication scheme (such as Long Term Evolution (LTE) and LTE-Advanced), and is provided with a wireless connection to a terminal located in a cell of the gNB 2300 via the antenna 2310. The wireless communication interface 2325 generally may comprise for example a Base-Band (BB) processor 2326 and an RF circuit 2327. The BB processor 2326 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 2321, the BB processor 2326 may have part of all of the above logic function. The BB processor 2326 may be a memory which stores a communication control program, or a module comprising a processor configured to execute a program and a related circuit. The function of the BB processor 2326 may be changed through program updating. The module may be a card or blade inserted in a slot of the base station equipment 2320. Alternatively, the module may also be a chip installed on a card or blade. Meanwhile, the RF circuit 2327 may comprise for example a frequency mixer, a filter and an amplifier, and transmit and receive a wireless signal via the antenna 2310.

As shown in FIG. 8, the wireless communication interface 2325 may comprise a plurality of BB processors 2326. For example, the plurality of BB processors 2326 may be compatible with a plurality of frequency bands used by the gNB 2300. As shown in FIG. 8, the wireless communication interface 2325 may comprise a plurality of RF circuits 2327. For example, the plurality of RF circuits 2327 may be compatible with a plurality of antenna elements. Although FIG. 8 shows an example in which the wireless communication interface 2325 comprises a plurality of BB processors 2326 and a plurality of RF circuits 2327, the wireless communication interface 2325 may also comprise a single BB processor 2326 or a single RF circuit 2327.

In the gNB 2300 as shown in FIG. 8, the transceiver device of the wireless communication apparatus at base station side according to the embodiment of the present disclosure may be realized by the wireless communication interface 2325. At least part of the functions of the processing circuitry and/or respective units of the electronic device or wireless communication apparatus at base station side according to the embodiment of the present disclosure may also be implemented by the controller 2321. For example, the controller 2321 may implement at least part of the functions of the processing circuitry and/or respective units of the electronic device or wireless communication apparatus at base station side according to the embodiment of the present disclosure by executing a program stored in the memory 2322.

In the foregoing description of the detailed embodiments of the present disclosure, features described and/or shown with respect to one embodiment may be used in one or more other embodiments in an identical or similar manner, be combined with features in other embodiments, or substitute features in other embodiments.

It should be emphasized that, the term "comprise/include" used herein refers to existence of features, elements, steps or assemblies, but does not preclude existence or addition of one or more other features, elements, steps or assemblies.

In the above embodiments and examples, reference numerals composed of digits are used to represent the respective steps and/or units. Those ordinarily skilled in the art should understand that, these reference numerals aim only to facilitate description and plotting, but do not represent an order thereof or any other limitation.

In addition, the methods of the present disclosure are not limited to be executed in the temporal order described in the specification, but may also be executed sequentially, in parallel or independently in other orders. Therefore, the execution order of the methods described in the present specification does not constitute a limitation to the technical scope of the present disclosure.

Although the present disclosure has been disclosed above by the description of the detailed embodiments of the present disclosure, it should be understood that all the above embodiments and examples are exemplary but not limitative. Those skilled in the art could design various modifications, improvements or equivalents with regard to the present disclosure within the spirit and scope of the appended claims. These modifications, improvements or equivalents should also be construed as being included within the scope of protection of the present disclosure.

The invention claimed is:

1. A first electronic device for performing wireless communication with a second electronic device via a plurality of bandwidth parts that are configured for the wireless communication through radio resource control (RRC) signaling, and where one or more of the configured bandwidth parts are activated for the wireless communication, the first electronic device comprising processing circuitry configured to:
determine a future occupation duration, in a second time period assigned to the second electronic device for transmission and that is beyond an expiration of a first time period assigned to the first electronic device for transmission, of a target bandwidth part of the one or more of the configured bandwidth parts that are activated for the wireless communication;
transmit, to the second electronic device, indication information of the future occupancy duration of the target bandwidth part so as to enable the second electronic device to make a decision about using the target bandwidth part in a future transmission in the second time period that follows the first time period,
wherein the decision is one of a set of predetermined possible decisions, the set of predetermined possible decisions comprising each of:
a decision not to conduct the future transmission in the target bandwidth part based on the future occupancy duration beyond the expiration of the first time period extending into the second time period by an amount of time that is greater than a predetermined threshold occupancy duration,
a decision to use only a portion of the target bandwidth part in the future transmission based on the future occupancy duration beyond the expiration of the first time period extending into the second time period by an amount of time that is greater than zero and less than the predetermined threshold occupancy duration, and a decision to use all of the target bandwidth part in the future transmission based on the future occupancy duration beyond the expiration of the first time period not extending into the second time period, and
conduct operations with the second electronic device in accordance with the decision made by the second electronic device.

2. The first electronic device of claim 1, wherein the indication information is transmitted to the second electronic device in a portion of the target bandwidth part that precedes the target bandwidth part to be used in the future transmission.

3. The first electronic device of claim 1, wherein the indication information is transmitted to the second electronic device in a portion of one of the activated one or more of the configured bandwidth parts that is adjacent to and that precedes the target bandwidth part to be used in the future transmission.

4. The first electronic device of claim 1, wherein the future occupation duration is determined by the first electronic device based on the first electronic device:
performing a listen-before-talk (LBT) procedure before attempting to perform communications with the second electronic device in the target bandwidth part in the first time period; and
receiving information indicating the future occupation duration during the listen-before-talk procedure.

5. The first electronic device of claim 4, wherein the information indicating the future occupation duration is included in a preamble that is received during the listen-before-talk procedure.

6. The first electronic device of claim 1, wherein the decision made by the second electronic device based on the indication information further includes one of:
not performing a listen-before-talk (LBT) procedure before attempting to perform communications with the first electronic device in the target bandwidth part between the expiration of the first time period and a beginning of the second time period,
before attempting to perform the communications with the first electronic device in the target bandwidth part between the expiration of the first time period and the beginning of the second time period, performing the LBT procedure without a random fallback,
before attempting to perform the communications with the first electronic device in the target bandwidth part between the expiration of the first time period and the beginning of the second time period, performing the LBT procedure with a size of a fallback contention window that is fixed, or
before attempting to perform the communications with the first electronic device in the target bandwidth part beyond the expiration of the first time period, performing the LBT procedure with a size of the fallback contention window that is variable.

7. The first electronic device of claim 1, wherein the first electronic device is a base station and the second electronic device is a user equipment.

8. The first electronic device of claim 1, wherein the first electronic device is a user equipment and the second electronic device is a base station.

9. The first electronic device of claim 1, wherein the decision comprises the decision not to conduct the future transmission in the target bandwidth part.

10. The first electronic device of claim 1, wherein the decision comprises the decision to use only the portion of the target bandwidth part in the future transmission.

11. The first electronic device of claim 1, wherein the decision comprises the decision to use all of the target bandwidth part in the future transmission.

12. A first electronic device for performing wireless communication with a second electronic device via a plurality of bandwidth parts that are configured for the wireless communication through radio resource control (RRC) signaling, and where one or more of the configured bandwidth parts are activated for the wireless communication, the first electronic device comprising processing circuitry configured to:
receive, from the second electronic device, indication information of a future occupancy duration, in a second time period assigned to the second electronic device for transmission aid that is beyond an expiration of a first time period assigned to the first electronic device for transmission, of a target bandwidth part of the activated one or more of the configured bandwidth parts,
make a decision about using the target bandwidth part in a future transmission in the second time period that follows the first time period,
wherein the decision is one of a set of predetermined possible decisions, the set of predetermined possible decisions comprising each of:
a decision not to conduct the future transmission in the target bandwidth part based on the future occupancy duration beyond the expiration of the first time period extending into the second time period by an amount of time that is greater than a predetermined threshold occupancy duration,
a decision to use only a portion of the target bandwidth part in the future transmission based on the future occupancy duration beyond the expiration of the first time period extending into the second time period by an amount of time that is greater than zero and less than the predetermined threshold occupancy duration, and
a decision to use all of the target bandwidth part in the future transmission based on the future occupancy duration beyond the expiration of the first time period not extending into the second time period; and
conduct operations with the second electronic device in accordance with the decision.

13. The first electronic device of claim 12, wherein the indication information is transmitted by the second electronic device in a portion of the target bandwidth part that precedes the target bandwidth part to be used in the future transmission.

14. The first electronic device of claim 12, wherein the indication information is transmitted by the second electronic device in a portion of one of the activated one or more of the configured bandwidth parts that is adjacent to and that precedes the target bandwidth part to be used in the future transmission.

15. The first electronic device of claim 12, wherein the future occupation duration is determined by the second electronic device based on the second electronic device:
performing a listen-before-talk (LBT) procedure before attempting to perform communications with the first electronic device in the target bandwidth part in the first time period; and
receiving the information indicating the future occupation duration during the listen-before-talk procedure.

16. The first electronic device of claim 15, wherein the information indicating the future occupation duration is included in a preamble that is received by the second electronic device during the listen-before-talk procedure.

17. The first electronic device of claim 12, wherein the decision comprises the decision to not conduct the future transmission in the target bandwidth part.

18. The first electronic device of claim 12, wherein the decision comprises the decision to use only the portion of the target bandwidth part in the future transmission.

19. The first electronic device of claim 12, wherein the decision comprises the decision to use all of the target bandwidth part in the future transmission.

20. The first electronic device of claim 12, wherein the decision made by the first electronic device based on the indication information further includes one of:
not performing a listen-before-talk (LBT) procedure before attempting to perform communications with the second electronic device in the target bandwidth part between the expiration of the first time period and a beginning of the second time period,
before attempting to perform the communications with the second electronic device in the target bandwidth part between the expiration of the first time period and the beginning of the second time period, performing the LBT procedure without a random fallback,
before attempting to perform the communications with the second electronic device in the target bandwidth part between the expiration of the first time period and the beginning of the second time period, performing the LBT procedure with a size of a fallback contention window that is fixed, or
before attempting to perform the communications with the second electronic device in the target bandwidth part between the expiration of the first time period and the beginning of the second time period, performing the LBT procedure with a size of the fallback contention window that is variable.

21. The first electronic device of claim 12, wherein the first electronic device is a base station and the second electronic device is a user equipment.

22. The first electronic device of claim 12, wherein the first electronic device is a user equipment and the second electronic device is a base station.

23. A method of performing wireless communication by a first electronic device with a second electronic device via a plurality of bandwidth parts that are configured for the wireless communication through radio resource control (RRC) signaling, and where one or more of the configured bandwidth parts are activated for the wireless communication, the method comprising:
determining a future occupation duration, in a second time period assigned to the second electronic device for transmission and that is beyond an expiration of a first time period assigned to the first electronic device for transmission, of a target bandwidth part of the one or more of the configured bandwidth parts that are activated for the wireless communication;
transmitting, to the second electronic device, indication information of the future occupancy duration of the target bandwidth part so as to enable the second electronic device to make a decision about using the target bandwidth part in a future transmission in the second time period that follows the first time period,
wherein the decision is one of a set of predetermined possible decisions, the set of predetermined possible decisions comprising each of:
a decision to not conduct the future transmission in the target bandwidth part based on the future occupancy duration beyond the expiration of the first time period extending into the second time period by an amount of time that is greater than a predetermined threshold occupancy duration,
a decision to use only a portion of the target bandwidth part in the future transmission based on the future occupancy duration beyond the expiration of the first time period extending into the second time period by an amount of time that is greater than zero and less than the predetermined threshold occupancy duration, and
a decision to use all of the target bandwidth part in the future transmission based on the future occupancy duration beyond the expiration of the first time period not extending into the second time period, and
conducting operations with the second electronic device in accordance with the decision made by the second electronic device.

24. A method of performing wireless communication by a first electronic device with a second electronic device via a plurality of bandwidth parts that are configured for the wireless communication through radio resource control (RRC) signaling, and where one or more of the configured bandwidth parts are activated for the wireless communication, the method comprising:
receiving, from the second electronic device, indication information of a future occupancy duration, in a second time period assigned to the second electronic device for transmission aid that is beyond an expiration of a first time period assigned to the first electronic device for transmission, of a target bandwidth part of the activated one or more of the configured bandwidth parts,
making a decision about using the target bandwidth part in a future transmission in the second time period that follows the first time period,
wherein the decision is one of a set of predetermined possible decisions, the set of predetermined possible decisions comprising each of:
a decision to not conduct the future transmission in the target bandwidth part based on the future occupancy duration beyond the expiration of the first time period extending into the second time period by an amount of time that is greater than a predetermined threshold occupancy duration,
a decision to use only a portion of the target bandwidth part in the future transmission based on the future occupancy duration beyond the expiration of the first time period extending into the second time period by an amount of time that is greater than zero and less than the predetermined threshold occupancy duration, and
a decision to use all of the target bandwidth part in the future transmission based on the future occupancy duration beyond the expiration of the first time period not extending into the second time period; and
conducting operations with the second electronic device in accordance with the decision.

25. A non-transitory computer readable medium containing instructions, that when executed by a processor, cause the processor to perform the method of claim 23.

26. A non-transitory computer readable medium containing instructions, that when executed by a processor, cause the processor to perform the method of claim 24.

* * * * *